United States Patent [19]
Funk et al.

[11] Patent Number: 5,809,067
[45] Date of Patent: Sep. 15, 1998

[54] WIRELESS PACKET DATA COMMUNICATIONS MODEM AND METHOD OF USE THEREIN

[75] Inventors: Gregory Funk, Delta; Ronald J. Vanderhelm, Surrey, both of Canada

[73] Assignee: Motorola, Inc., Schaumburg, Ill.

[21] Appl. No.: 260,501

[22] Filed: Jun. 15, 1994

Related U.S. Application Data

[63] Continuation of Ser. No. 143,689, Oct. 28, 1993, abandoned.

[51] Int. Cl.$^6$ ...................................................... H04B 1/38
[52] U.S. Cl. ........................................... 375/222; 375/272
[58] Field of Search ............................... 375/7, 8, 36, 200, 375/202, 203, 205, 219, 222, 272, 258; 370/30, 99, 18; 455/73, 84, 88, 89, 90; 340/310 A, 310 R; 361/683, 685, 686, 725, 752; 379/98; 329/300; 332/100; 371/43

[56] References Cited

U.S. PATENT DOCUMENTS

| | | | |
|---|---|---|---|
| 4,354,252 | 10/1982 | Lamb et al. | 455/73 |
| 4,951,301 | 8/1990 | Gross et al. | 375/8 |
| 4,972,432 | 11/1990 | Wilso et al. | 375/7 |
| 5,033,111 | 7/1991 | Marui | 455/89 |
| 5,050,041 | 9/1991 | Shafi | 375/8 |
| 5,161,169 | 11/1992 | Galano et al. | 375/8 |
| 5,201,067 | 4/1993 | Grube et al. | 455/89 |

OTHER PUBLICATIONS

*Electronic Design*, Aug. 5, 1993, "Miniaturized Transceiver Combines Frequency Hopping, Dual Conversion, and SAW Filtering For Low Error Rate," Milt Leonard, pp. 45–50.

*Primary Examiner*—Tesfaldet Bocure
*Attorney, Agent, or Firm*—Charles W. Bethards; Kevin A. Buford

[57] ABSTRACT

A computing device (100) including a wireless packet data communications modem (101) used in conjunction with a computer (103) to provide untethered access to data bases and other computer users. A method is provided for controlling data transmission and reception using the wireless packet data communications modem (101) in tandem with the computer (103). Two-way communications is achieved using a small, low-cost, light-weight wireless packet data communications modem contained in a housing, integral to a computing device, or a removable housing conforming to a PCMCIA industry standard.

23 Claims, 6 Drawing Sheets

WIRELESS PACKET DATA COMMUNICATIONS MODEM AND METHOD OF USE THEREIN

This is a continuation of application Ser. No. 08/143,689, filed Oct. 28, 1993 and now abandoned.

FIELD OF THE INVENTION

This disclosure deals generally with wireless communications modems and more specifically but not limited to packet data communications modems cooperatively arranged with computing devices.

BACKGROUND OF THE INVENTION

As the information age continues to unfold the utility associated with, if not necessity of, untethered communications has become increasingly apparent. That such communications should include data may be self evident. The local translation and manipulation of local or remote data, requisite to the production of information, virtually mandates a degree of associated local computing capability. Practitioners, attempting to serve this untethered or portable marketplace, have labored to provide products with varying degrees of the requisite utility.

Portable wireless data terminals allowing the transmission to remote locations of local data as well as the reception and display of remote data are now known. These data terminals lack the storage and operator interface capabilities and flexibility ordinarily associated with a plausible computing device. Likewise portable computers have been shown. Such computers having wireline access to remote databases by way of the public switched telecommunications network are available. Portable computers with the capability of wireless reception of data have been demonstrated. These computers all lack the highly coveted attribute of two way wireless access to remote data bases. Similarly, rudimentary wireless data transceivers arranged to be utilized with portable computers, although contemplated, lack even the elementary intelligence or processing capability required for media access.

In all of these endeavors to satisfy this untethered and portable marketplace, practitioners have been limited by the realities of technology and human imagination. Products must simultaneously be useful and convenient to the individual on the move. Today this implies extensive communications and computing capabilities together with sufficient battery life all in a physical size and weight that is practical for an individual on the move. That one or more requisite attributes is lacking in all of the known and contemplated products has been shown. Neither is a mere combination of such products an answer given the practical constraints on size, weight, and battery life either in combination or singularly. Clearly an urgent need exists for a wireless packet data communications modem that addresses the attributes required by the untethered marketplace.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

DETAILED DESCRIPTION OF A PREFERRED EMBODIMENT

Generally the present invention provides an apparatus and method of providing wireless packet data communications in a portable environment where small size, light weight, low power consumption, low cost, and general flexibility are requirements. This is accomplished by an inventive configuration, a wireless packet data communications modem, which operates as a "dumb" peripheral of its host computing device and a method, embodied in a modem driver software routine, which performs packet assembly and disassembly, acknowledgments, message buffering, Automatic Repeat Request (ARQ), and similar network and protocol functions. The modem performs the functions of signal encoding and decoding, error correction, message identification detection, and other hardware support functions.

The wireless packet data communications modem comprises a radio-frequency transceiver and a logic unit, arranged to rely on and operate with an "intelligent" controller, such as a general purpose processor or Digital Signal Processor (DSP) chip, located external to the packet data communications modem in a preferred embodiment. These processors, along with memories and support circuits, traditionally require a large amount of power to operate, consume a large amount of space, and cost a great deal of money.

The packet data modem embodiment of the present invention is typically used integral to a host computing device, and therefore can advantageously eliminate the redundancy of costly power consuming processors by implementing certain signaling and time-critical functions in a custom logic unit and many other logical functions in the host's own processor. The result is a modest additional load on the host processor and a single application specific integrated modem chip based logic unit in place of the expensive, power-hungry, space-wasting multiple processor configuration.

Figure 1:
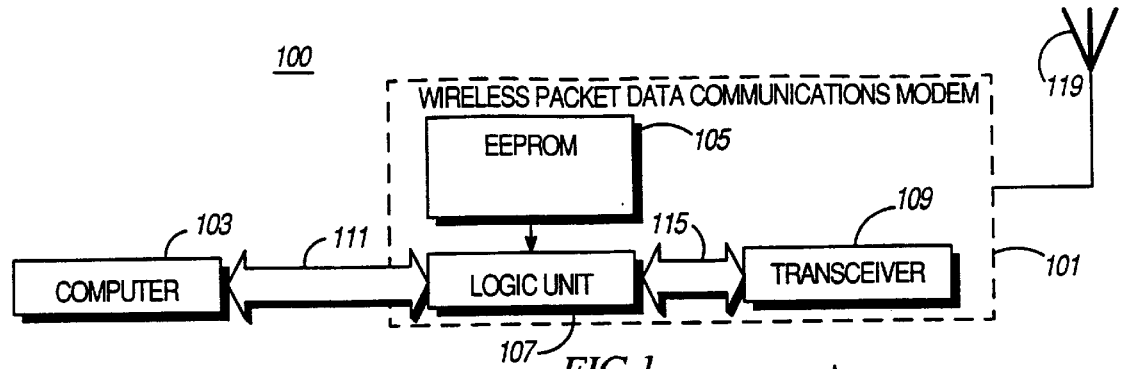
FIG. 1 is a block diagram of a computing device in accordance with one embodiment of the instant invention.

The present invention can be more fully described and appreciated with reference to the Figures in which FIG. 1 is a general block diagram of a computing device (100) having wireless packet data communications capability. The computing device (100) includes a wireless packet data communications modem (101) and a computer (103), coupled together at a controller interface (111). In a preferred embodiment, the controller interface (111) is a standard electrical interface, such as the Personal Computer Memory Card International Association (PCMCIA) Card Interface Release 2.0 electrical standard, published by the Personal Computer Memory Card International Association, 1030B East Duane Avenue, Sunnyvale California.

The computer (103) is any general-purpose data processor, such as a portable laptop or notebook computer, an electronic organizer, or a desktop computer, including other devices with computer like attributes. The wireless packet data communications modem (101) includes an Electrically Erasable Programmable Read-Only Memory (EEPROM) (105) for storing information required for transmission and reception of data, a logic unit (107) for performing time critical signaling functions, and a transceiver (109) for sending and receiving radio frequency signals.

The transceiver (109) can be configured to operate in conventional technologies, such as Frequency Division Multiple Access (FDMA) or Time Division Multiple Access (TDMA). Also the transceiver (109) could be configured to operate in spread spectrum technologies, such as Code Division Multiple Access (CDMA) or Frequency-Hopped.

The controller interface (111) provides power, transmit data blocks, and control information to a logic unit (107) from the computer (103). The controller interface (111) also provides error-corrected, de-interleaved data blocks from the logic unit (107) to the computer (103).

The logic unit (107) is electrically connected to the EEPROM (105) and the transceiver (109). The logic unit (107) is used to read various information including, for example, tuning data and message address information from the EEPROM (105). The logic unit (107) also sends a transmit data waveform to the transceiver (109) and receives a de-modulated data signal from the transceiver (109) through an interface (115). The logic unit (107) is generally responsible for various functions including signal encoding and decoding, error correction, message identification detection, and hardware support functions. The Interface (115) includes various control lines, such as transmit or receive switching and frequency programming for the transceiver (109). The transceiver (109) transmits and receives signals through an antenna (119), as is well known in the art.

In practice and preferably the data modem (101) will be physically included with the computer (103). This may be facilitated by a physical package that conforms to the PCMCIA industry standard that will be appreciated with reference to FIG. 2 and alternatively to FIG. 3.

Figure 2:
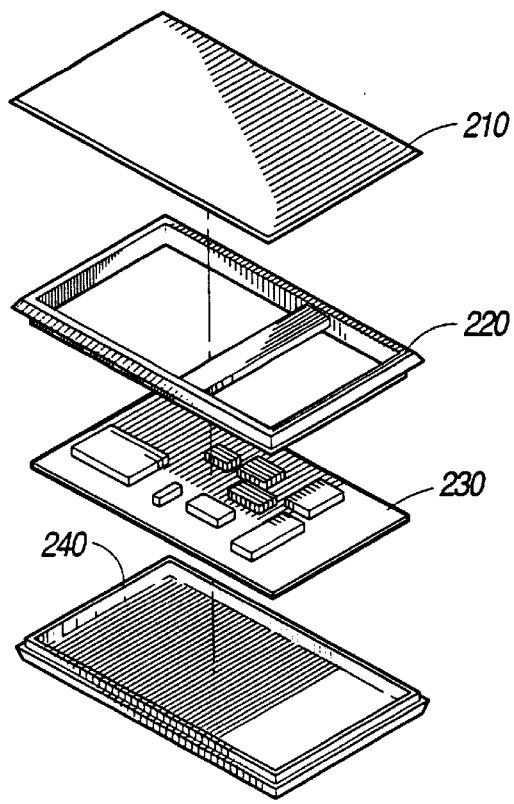
FIG. 2 is a perspective view of a data modem in accordance with one embodiment of the instant invention.

FIG. 2 shows a perspective view of the primary structural components of one embodiment of the wireless packet data communications modem including an illustrative physical package. The inventive attributes of the present invention, as previously described, facilitate the wireless packet data communications modem's (101) containment in a relatively small housing, approximating the size of the PCMCIA Type II format. The specified dimensions of a PCMCIA Type II package are 85.60 mm×54.0 mm×5mm.

A printed circuit board (PCB) (230) contains or carries electronic devices and one or more integrated circuits or chips that together comprise the wireless packet data communications modem (101). The PCB (230) is sandwiched between a top housing (210) and a bottom housing (240), that are preferably of a material, such as metal or other conductive elements that provides an electromagnetic interference (EMI) shielding function. The top housing (210), bottom housing (240), and PCB (230) are provided structural support by a chassis (220).

The embodiment of the present invention, shown in FIG. 2, is representative of a physical package designed to be largely disposed within a housing of the computer (103). This embodiment shares a power source and a processor with the computer (103), as will be more fully described below.

Figure 3:
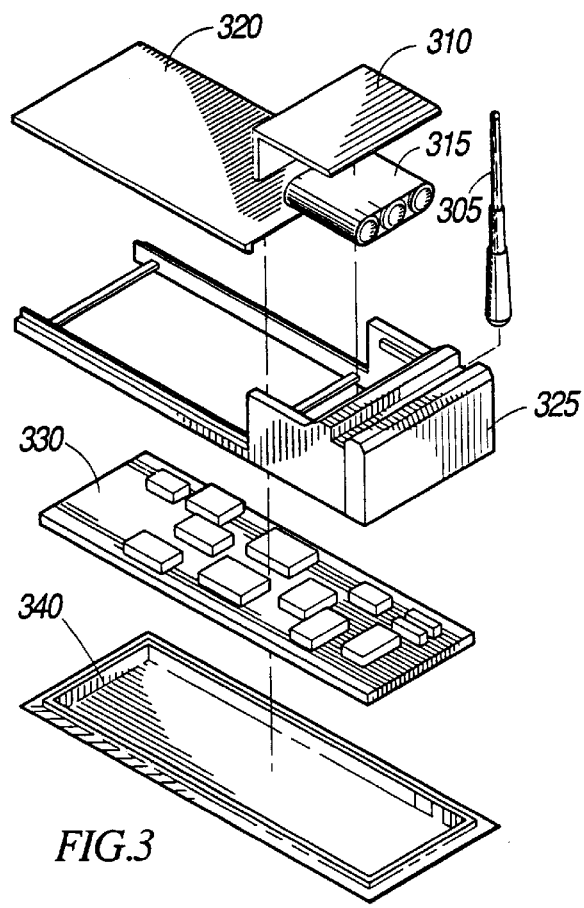
FIG. 3 is a perspective view of a data modem in accordance with an alternative embodiment of the instant invention.

In FIG. 3 a perspective view of another embodiment of the structural components of the present invention is shown. A printed circuit board (PCB) (330) contains electronic devices and integrated circuits, including a processor, that comprise the wireless packet data communications modem (101). The PCB (330) is sandwiched between a top housing (320) and a bottom housing (340), that preferably provide an electromagnetic interference (EMI) shielding function. The top housing (320), bottom housing (340), and PCB (330) are provided with structural support by a chassis (325).

The chassis (325) also includes a battery housing for a battery (315), which in a preferred embodiment are rechargeable Nickel-Cadmium (NiCad) battery cells. A battery cover (310) encloses the battery housing and the battery (315) as shown. An antenna (305) attaches or is mechanically coupled to the chassis (325) and is electrically connected to the PCB (330) to provide signal reception and transmission capabilities.

The housing depicted in FIG. 3 conforms in part to the PCMCIA Type II standard in that the connector and front card portion of the assembly, defined by the dimensions of the top housing (320), is designed to engage a PCMCIA Type II card slot and connector.

The FIG. 3 embodiment as depicted has its own power source, such as the battery (315) shown, antenna (305), and the processor, as will be more fully described below. The resulting design gives this embodiment some advantages over the FIG. 2 embodiment, including the capability to receive and transmit even if or when physically disassociated from the computer (103). Further this embodiment limits or eliminates any power drain from the host computer (103) and minimizes any computational load, associated with computing tasks during transmission and reception of data, for the computer (103).

Figure 4:
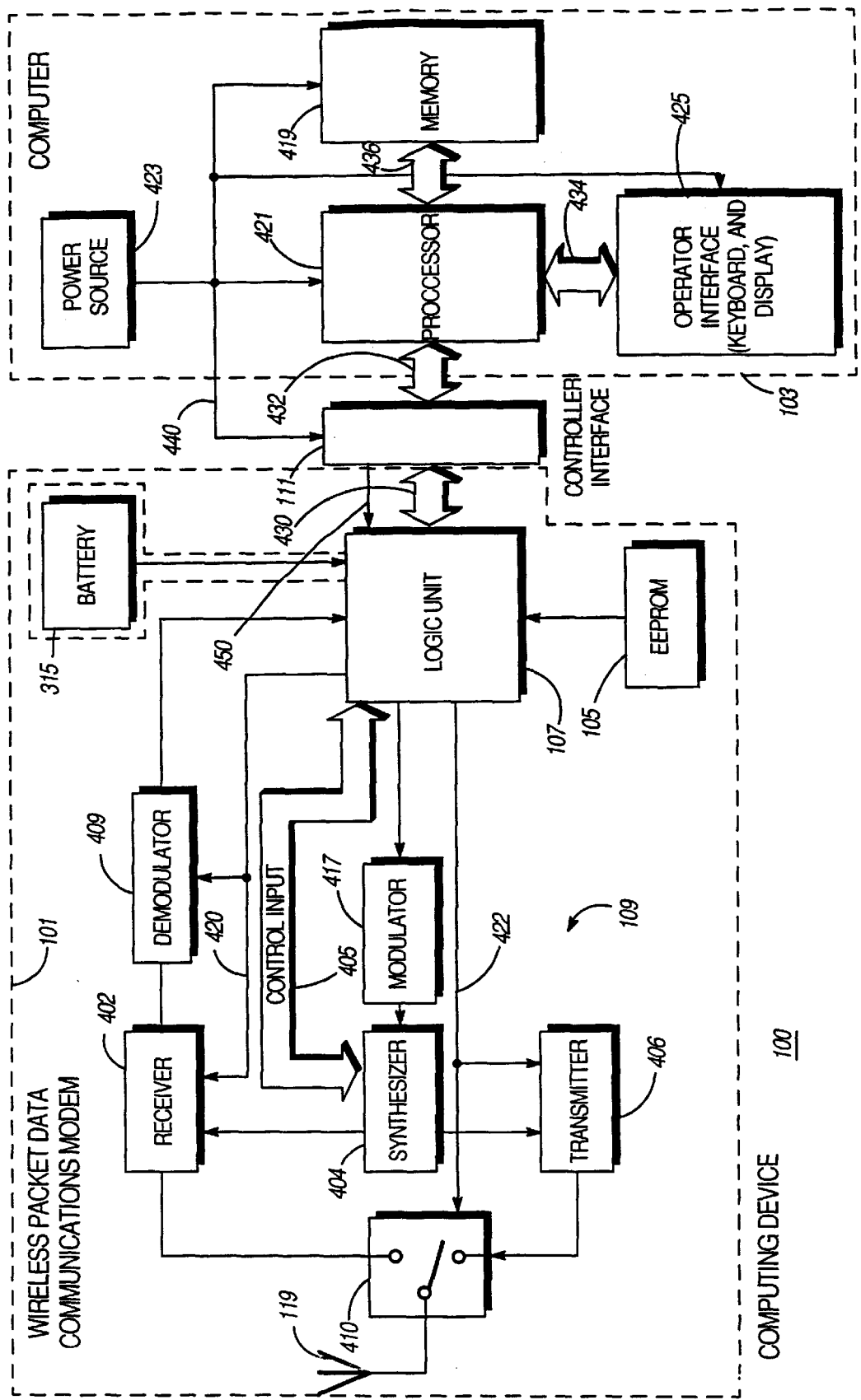
FIG. 4 is a detailed block diagram of a computing device in accordance with a preferred embodiment of the instant invention.

For a more thorough description, including the relevant details, of the computing device (100) the reader is referred to FIG. 4 in which like reference numerals refer to like elements from FIG. 1. In FIG. 4, the computing device (100) includes the host computer (103) coupled through the controller interface (111) to the wireless packet data communications modem (101) with the antenna (119).

The computer (103) is comprised of a processor (421), a memory (419), a power source (423), and an operator interface, such as a keyboard and a display (425). These elements are electrically coupled as depicted and well known. The processor (421) writes/reads data to/from the memory (419) via data and control lines (436). The processor (421) provides an output and accepts an input, respectively, to or from the operator interface (425) via an Input/Output (I/O) bus interface (434). The power source (423) is integral to the computer (103) and provides power to the processor (421), the memory (419), and the operator interface (425).

In one embodiment of the present invention, the housing of the computer (103) contains the wireless packet data communications modem (101). This embodiment shares the power source (423) and the processor (421) with the computer (103). Power is delivered from the power source (423), as opposed to battery (315) in an alternative embodiment, to the controller interface (111) at (440) and from the controller interface (111) to the logic unit (107) at (450). Similarly, data and control information is shared between the processor (421) and the logic unit (107) through the controller interface (111) via a data and a control bus (430, 432).

The logic unit (107) is electrically coupled to the EEPROM (105). Tuning data and message IDs assigned to the computing device 100 are read from the EEPROM into the logic unit (107) and transferred to and from the processor (421) as required and further disclosed in a co-pending application designated PD 05022AV, inventor Beaudoin, et al having a like filing date and assigned to the same assignee as here.

For data transmission, the transceiver (109) is coupled to and controlled by the logic unit (107). The logic unit (107) constructs a data waveform from one or more data blocks sent via the controller interface (111) from the processor (421). The logic unit (107) sends the data waveform to a modulator (417). The modulator (417) modulates a radio-frequency carrier with the data waveform using a synthesizer (404), as is known. The synthesizer (404) is programmed by the logic unit (107) using a control input (405). The control input (405) provides control information including operating parameters for the synthesizer (404).

The modulator (417) performs a type of modulation, such as preferably two or four-level frequency shift keyed modulation (FSK) or a linear type of modulation or other type typically used for wireless data transmission.

The modulated waveform is sent to a transmitter (406) for transmission via the antenna (119). Prior to the transmission, a Transmit/Receive (T/R) switch (410) is programmed to a transmit state by the logic unit (107). The logic unit (107) controls the transmitter (406) and the T/R switch (410) via a control path (422).

Alternatively, data reception is accomplished utilizing the transceiver (109), which receives a modulated radio frequency carrier via the antenna (119) and a receiver (402), using the synthesizer (404) to provide a receiver reference signal at the appropriate frequency. Prior to the reception the T/R switch (410) must be set to a receive state, as controlled by the logic unit (107).

The receiver (402) passes the modulated radio frequency carrier to a demodulator (409), which provides a demodulated data signal to the logic unit (107). The logic unit (107) controls the T/R switch (410), the receiver (402), and the demodulator (409) with control lines (420, 422). This embodiment has the unique advantages of small size, low weight, and low power drain.

Alternatively, in another embodiment of the present invention, as shown in FIG. 3, the wireless packet data communications modem (101) can be physically removed from the housing of the computer (103). In this instance, the controller interface (111) is preferably a connector that complies with the PCMCIA interface standard. This embodiment may utilize a separate power source, such as the battery (315) for power and the logic unit (107) may include general processor functionality, as well as the capabilities described above. The processor functionality is similar to that provided by the processor (421), which in this embodiment is not used for communications processing.

Figure 4A:
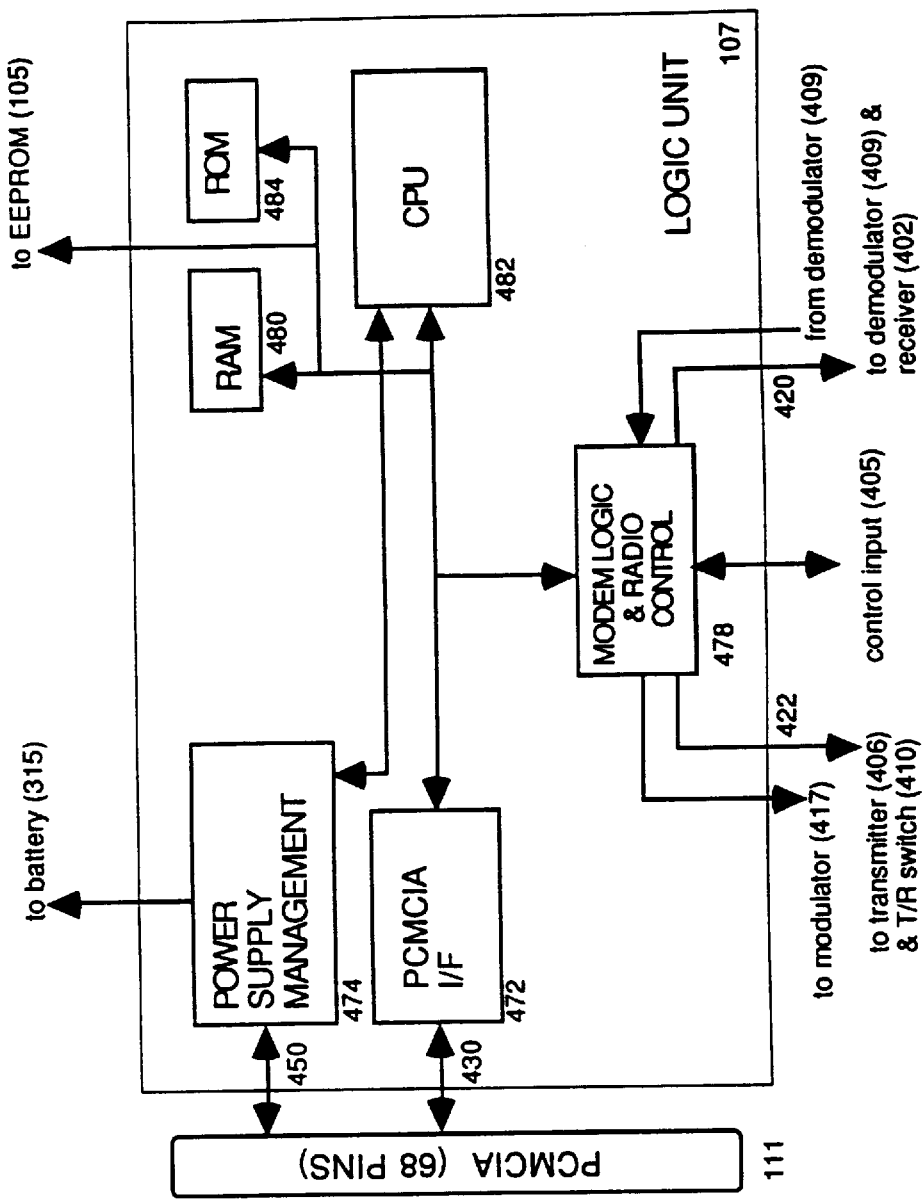
FIG. 4a is a detailed block diagram of a logic unit in accordance with an alternate embodiment of the present invention.

Provided for further illustration is FIG. 4a, a detailed block diagram of the logic unit (107), as required in the alternative embodiment depicted in FIG. 3 and described above. This alternative embodiment is different in that an on-board CPU (482) is provided to perform the general processing functions that are done by the host processor (421) in the preferred embodiment. It will be self-evident to one of ordinary skill in the art that the logic unit (107) operates as a data interface in the fashion described below.

The PCMCIA interface (472), internal to the logic unit (107), is coupled to the controller interface (111). The PCMCIA interface (472) is also coupled to the CPU (482) and handles the communications between the processor (421) in the host computer (103) and the CPU (482). The CPU (482) is a processor capable of very low standby current, such as the 16-bit Motorola 68330 processor, commercially available from Motorola, Inc., 1303 E. Algonquin Road, Schaumburg, Ill.

The PCMCIA interface (472) is mapped over a standard PCMCIA I/O port, that is configured as a standard PC COM port type communication device. This PCMCIA interface is logically equivalent to the host port of a NS16550 universal asynchronous receiver/transmitter, commercially available from National Semiconductor Corporation, 2900 Semiconductor Drive, P.O. Box 58090, Santa Clara, Calif. and provides the communications between the host processor (421) and the on-board CPU (482). The on-board CPU (482) executes the radio control software, which is stored in ROM (484). Memory for the CPU (482) consists of factory programmable ROM (484), including memory for the storage of configuration information, and RAM (480) to store data, such as, messages. The configuration information is stored, for example, in EEPROM (105) or in flash memory.

Also included in the logic unit (107) are PCMCIA support functions (472) and power supply management (474). The power supply management (474) interfaces to the battery (315), the CPU (482), and the host processor (421) via the controller interface (111). The power supply management block (474) provides the appropriate power supply voltage from the battery (315) and controls the application of power to the wireless packet data communication modem (101), given the various states of power on/off and sources of power between the computer (103) and wireless packet data communication modem (101).

Modem logic and radio control (478) supports communication with the RF channel, being coupled to the CPU (482) and the transceiver, i.e. modulator (417), demodulator (409), and control input (405). The modem logic and radio control (478) programs the synthesizer (404) via control input (405) and provides control for the transceiver via 420 and 422. The modem logic (478) provides functions, such as, Forward Error Correction, Block Assembly/Disassembly, Frame Sync Detection, Automatic Level Control, and Message ID Detect among others.

The logic unit (107) is preferably substantially embodied in a semi-custom designed Application Specific Integrated Circuit (ASIC). The combination of concern and care toward space conservation known in the art, standard off-the-shelf components, together with high levels of integration in a custom ASIC provides a design that can be implemented on a printed circuit board (PCB) substantially compatible with the PCMCIA Type II format or an extended version thereof. The PCB has the approximate dimensions of 46 mm×135 mm.

The on-board CPU (482), in conjunction with the RAM (480), antenna (119), and its own battery (315), preferably off-the-shelf alkaline cells, enable stand-alone operation, specifically, the ability of the wireless packet data communications modem (101) to send and receive messages, even when physically disassociated from the computer (103).

It is also contemplated that the stand-alone wireless packet data communications modem may include user input/output (I/O), such as switches, pushbuttons, a touchscreen, or a display, for example, Light Emitting Diodes (LEDs) or Liquid Crystal Display (LCD). These elements are coupled to the CPU (482) so as to cooperatively operate to provide user I/O, such as battery low indication, message waiting indication, and transceiver-in-range indication, as is known in the art.

Appreciation of a method embodiment of the preferred embodiment of the preferred embodiment of the instant invention will be facilitated by a description of the FIG. 4 computing device in a first operating mode. This description refers to and describes the FIG. 5 data structure diagram in conjunction with the FIG. 7 process flow diagram.

Figure 7:
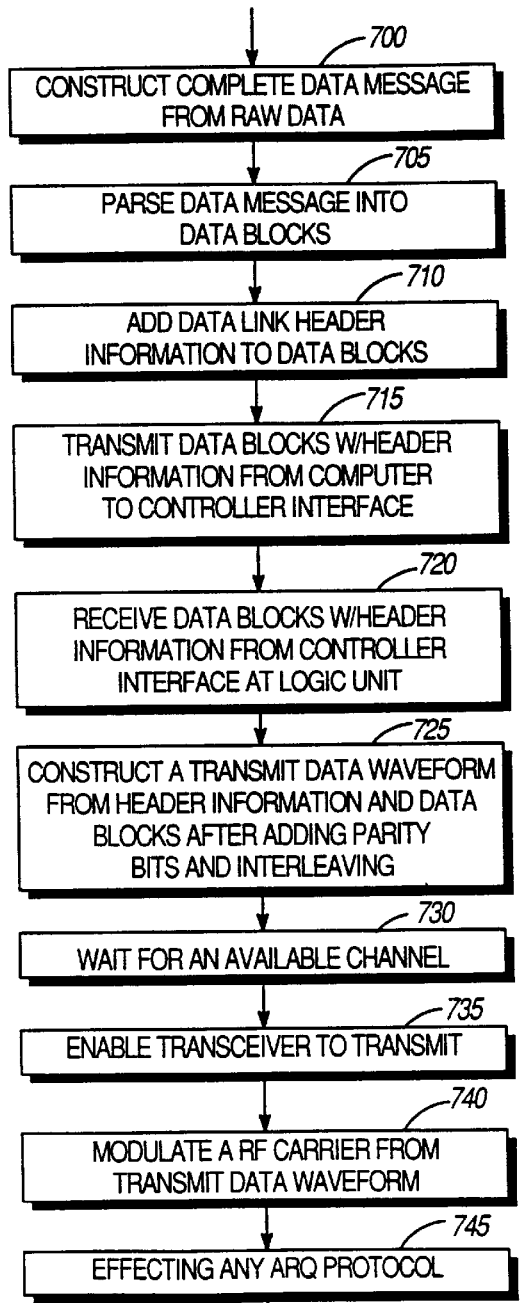
FIG. 7 is a process flow chart in accordance with a method embodiment of the instant invention.
Figure 5:
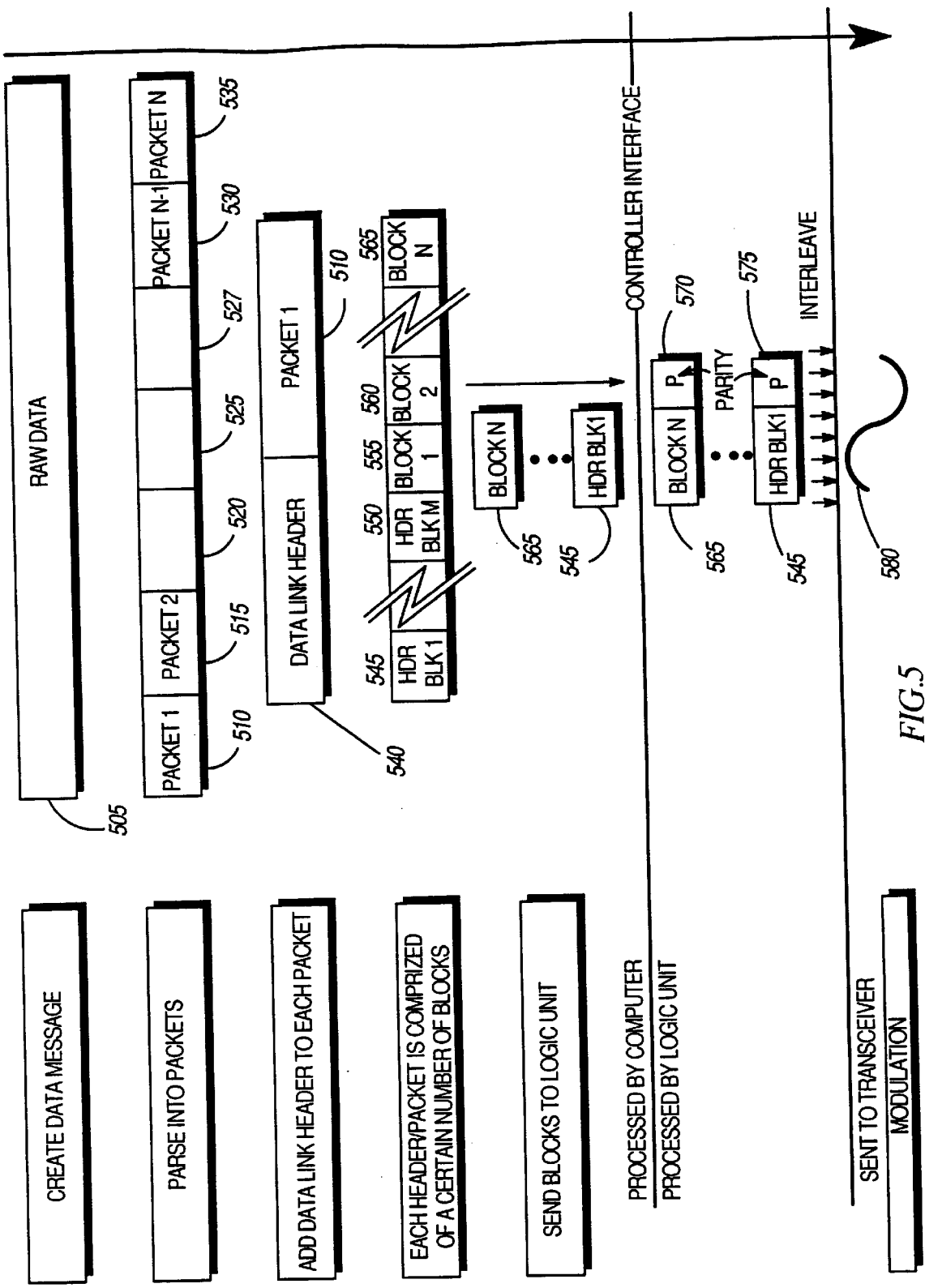
FIG. 5 is a data structure diagram exemplifying one mode of operation of the FIG. 4 embodiment of the instant invention.

Referring jointly to FIG. 5 and FIG. 7, representing a first operating mode of data transmission, raw data sequence (505) represents a message or data to be transmitted. The raw data sequence (505) may be provided by the user or a software application. A complete data message is constructed from the raw data sequence at step (700) by the computer (103). The data message is parsed at step (705) into individual packets (510–535). A data link header (540) is added at step (710) to each packet (510 . . . ). In a preferred embodiment, each data link header (540) and packet (510) combination is broken down into smaller six-byte transmit data blocks (545–565), which are sent at step (715) by the processor (421) to the controller interface (111). At step (720) the logic unit (107) receives the transmit data blocks (545–565) from the controller interface (111).

The logic unit (107) constructs a transmit data waveform from the transmit data blocks (545–565) at step (725). In order to create the transmit data waveform (580), error correction or parity bits (570–575) are calculated and appended to each of the transmit data blocks (545, 565). The transmit data blocks (545–565) and error correction/parity information (570–575) are then interleaved, as is well known in the art, to increase the percentage of error recovery and reduce packet re-transmission attempts. The logic unit (107) buffers the data and waits for an available channel at step (730).

When a channel is available, the logic unit (107) enables the transmitter (406) and sets the T/R switch (410) to the transmit state at step (735). The interleaved transmit data blocks (545–565) are sent to the transceiver (109) as a transmit data waveform (580). At step (740) a radio frequency carrier is modulated by the transmit data waveform (580), as is known in the art.

In a preferred embodiment of the present invention, an Automatic-Repeat Request (ARQ) protocol, such as Go-Back-N ARQ is implemented. The ARQ protocol is effected at step (745) by the processor (421), as is known in the art. If a packet is requested to be re-transmitted, the method as described above is repeated according to the ARQ protocol implemented.

Appreciation of an alternative method embodiment of the preferred embodiment of the instant invention may be facilitated by a description of the FIG. 4 computing device in a second operating mode. This description refers to and describes the FIG. 6 data structure diagram in conjunction with the FIG. 8 process flow diagram.

Figure 8:
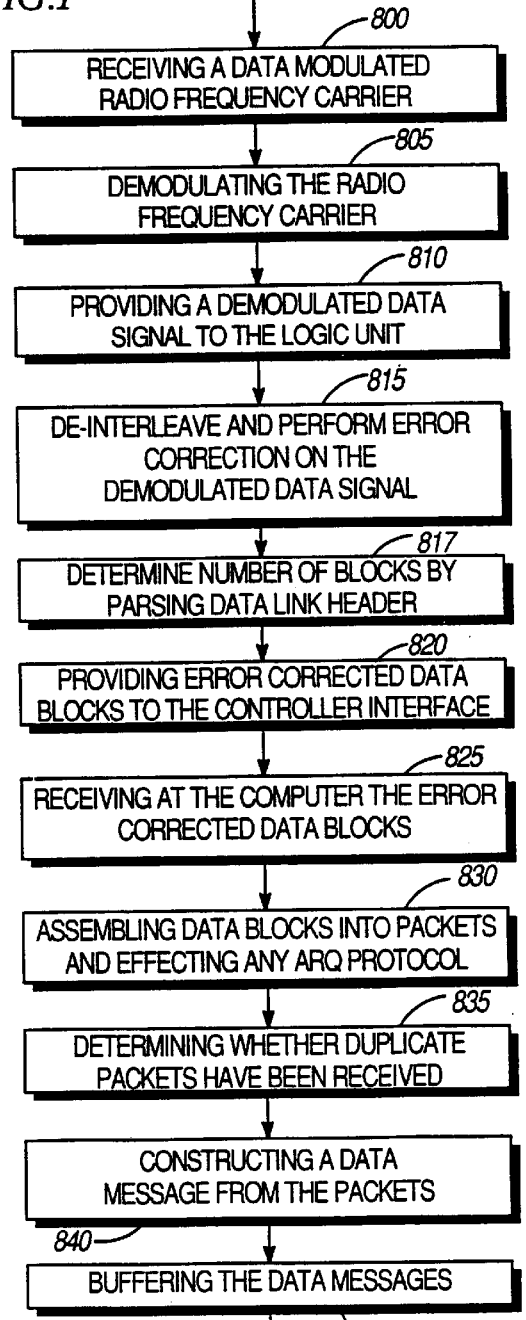
FIG. 8 is a process flow chart in accordance with an alternative method embodiment of the instant invention.
Figure 6:
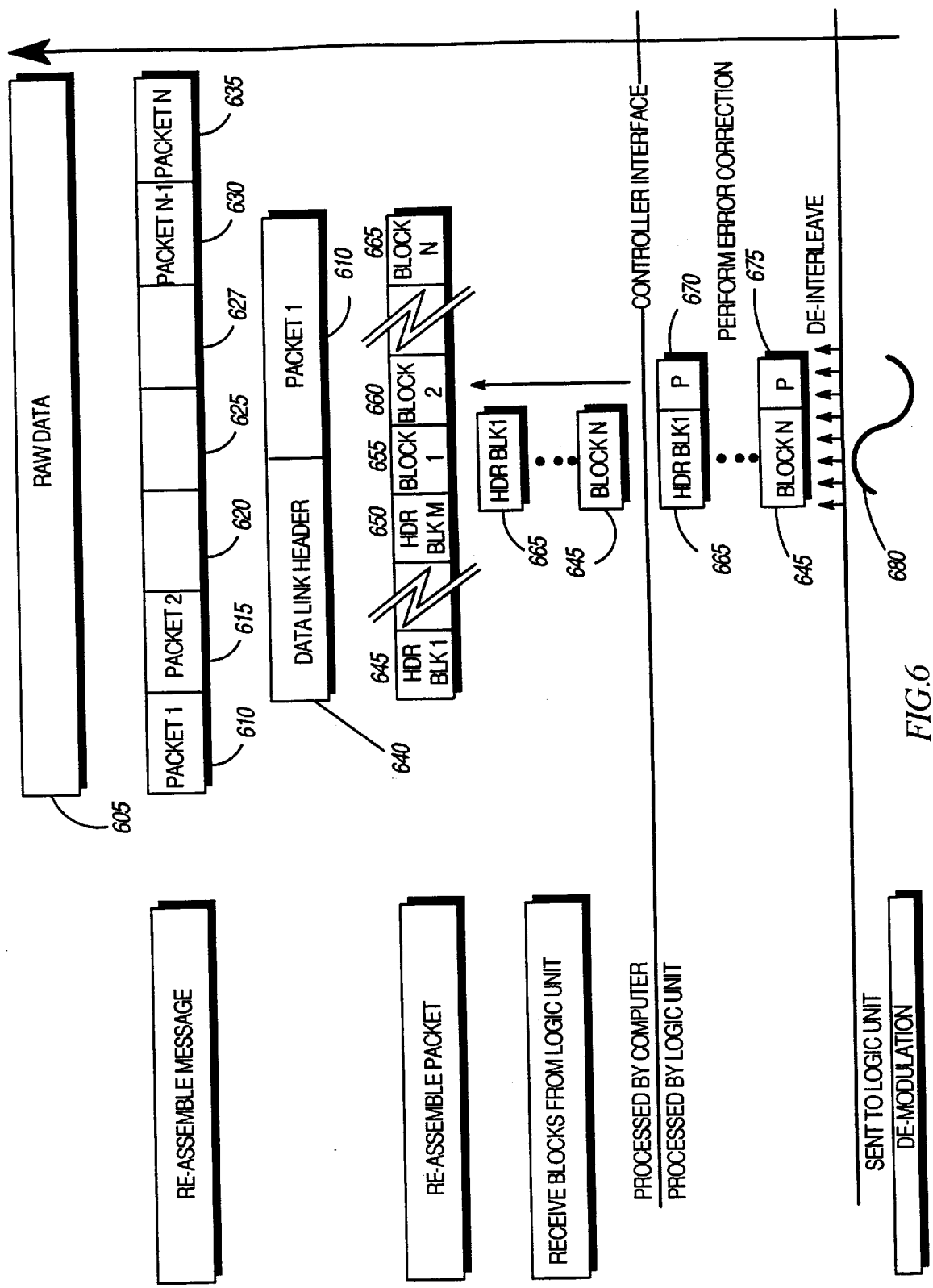
FIG. 6 is a data structure diagram exemplifying an alternative mode of operation of the FIG. 4 embodiment of the instant invention.

Referring jointly to FIG. 6 and FIG. 8, representing a second operating mode of data reception, a data modulated radio frequency carrier is received at step (800) by the receiver (402) utilizing the antenna (119). The radio frequency carrier is demodulated at step (805) and a demodulated data signal (680) is provided to the logic unit (107) at step (810).

The logic unit (107) de-interleaves the demodulated data signal into data blocks (645–665) and error correction is performed at step (815) using parity and error correction information (670–675). At step (817) the logic unit (107) determines the total number of data blocks in the packet by extracting the information from the header data blocks (645–650), which comprise the packet's data link header (640).

The error-corrected data blocks (645–665) are sent to the controller interface (111) by the logic unit (107) at step (820). At step (825) the computer (103) receives the error-corrected data blocks (645–665) from the controller interface (111). The computer (103) assembles the error-corrected header data blocks (645–650) into a data link header (640) and error-corrected data blocks (655–665) into a packet (610) at step (830). In a preferred embodiment, an ARQ protocol is effected as part of step (830) by the computer (103) to request the re-transmission of any packet received that is not in accordance with the ARQ protocol implemented.

The computer (103) determines whether duplicate packets have been received at step (835) and discards any duplicates. This could occur based on the ARQ scheme being used. At step (840) a data message is constructed from error-corrected data blocks (645–665) by reassembling a data message (605) from the packets (610–635). The data message (505) is buffered by the computer (103) whenever required, such as when multiple messages have been received.

Thus it will be appreciated by those of ordinary skill in the art that the apparatus and method disclosed provide a small, light-weight, low-cost, power-saving radio-frequency modem for use in wireless data communications. Furthermore, the present invention satisfies the long-felt need of mobile data computing by providing two-way wireless communications for the general-purpose computing device. In addition, the present invention enables the user to receive and send data even when the wireless packet data communications modem is physically disassociated from the host computer.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A wireless packet data communications modem, comprising:
   a transceiver having a control input, a modulator for impressing modulation on a radio frequency carrier, and a demodulator for providing a demodulated data signal,
   a logic unit, coupled to said modulator, said demodulator and said control input for providing, in response to a transmit data block received at said logic unit, a data wave form input to said modulator and for providing, responsive to said demodulated data signal, error corrected data blocks and
   a controller interface for interfacing with a computer and for providing said transmit data block from the computer to said logic unit and for providing said error corrected blocks from said logic unit to the computer.

2. The wireless packet data communications modem of claim 1, wherein said controller interface substantially complies to the Personal computer memory card international association electrical standard.

3. The wireless packet data communications modem of claim 2, further comprising:
   a housing for containment of said modem, said housing conforming substantially to the Personal computer memory card international association Type II format.

4. The wireless packet data communications modem of claim 2, further comprising:
   a housing for containment of said modem, said housing conforming at least in part to the Personal computer memory card international association Type II format.

5. The wireless packet data communications modem of claim 1, wherein said transceiver is configured to operate as a frequency division multiple access transceiver.

6. The wireless packet data communications modem of claim 1, wherein said transceiver is configured to operate as a time division multiple access transceiver.

7. The wireless packet data communications modem of claim 1, wherein said transceiver is configured to operate as a code division multiple access transceiver.

8. The wireless packet data communications modem of claim 1, wherein said transceiver is configured to operate as a frequency hopped spread spectrum transceiver.

9. The wireless packet data communications modem of claim 1, wherein said modulation is frequency shift keyed modulation.

10. The wireless packet data communications modem of claim 9, wherein said frequency shift keyed modulation is a four level modulation.

11. The wireless packet data communications modem of claim 9, wherein said modulation is two level modulation.

12. The wireless packet data communications modem of claim 1, wherein said modulation is a linear form of modulation.

13. The wireless packet data communications modem of claim 1, wherein said error-corrected data blocks have been de-interleaved, error corrected, and buffered prior to providing said error corrected blocks to said controller interface.

14. A wireless packet modem according to claim 1, wherein the transceiver and the logic unit are housed within a housing for interfacing with the computer via the controller interface.

15. A wireless packet modem according to claim 14, wherein the housing conforms substantially to PCMCIA standards.

16. A wireless packet data communications modem, comprising:
   a transceiver having a control input, a modulator for impressing modulation on a radio frequency carrier, and a demodulator for providing a demodulated data signal,
   a logic unit, coupled to said modulator, said demodulator and said control input, for providing, in response to a transmit data block received at said logic unit, a data wave form input to said modulator, said logic unit having de-interleaving, error correcting, and buffering functions responsive to said demodulated data signal, for error correcting, de-interleaving and buffering said demodulated data signal and for providing error corrected data blocks and
   a controller interface for interfacing with a computer and for providing said transmit data block from the computer to said logic unit and for providing said error corrected blocks from said logic unit to the computer.

17. A wireless packet modem according to claim 16, wherein the transceiver and the logic unit are housed within a housing for interfacing with the computer via the controller interface.

18. A wireless packet modem according to claim 17, wherein the housing conforms substantially to PCMCIA standards.

19. A wireless packet data communications modem, comprising:
   a transceiver having a control input, a modulator for impressing modulation on a radio frequency carrier, and a demodulator for providing a demodulated data signal,
   a logic unit, coupled to said modulator, said demodulator and said control input, for providing, in response to a transmit data block received at said logic unit, a data wave form input to said modulator, said logic unit having at least error correcting functions responsive to said demodulated data signal, for error correcting said demodulated data signal and for providing error corrected data blocks,
   a computer comprising a host processor and
   a controller interface coupled to said computer and said logic unit for providing said transmit data block from said computer to said logic unit and for providing said error corrected blocks from said logic unit to said computer.

20. A wireless packet data communications modem according to claim 19, wherein the logic unit and the computer have separate power sources.

21. A wireless packet modem according to claim 19, further comprising a first housing for containment of said computer and a second housing for containment of said transceiver and said logic unit, said second housing disposed at least in part within said first housing.

22. A wireless packet modem according to claim 21, wherein the second housing conforms substantially to PCMCIA standards.

23. The wireless data packet modem of claim 1 wherein said modem is operable to send and receive messages when physically associated with said computer and when physically disassociated from said computer.

* * * * *

UNITED STATES PATENT AND TRADEMARK OFFICE
CERTIFICATE OF CORRECTION

PATENT NO : 5,809,067
DATED : 9/15/98
INVENTOR(S) : Funk et al.

It is certified that error appears in the above-identified patent and that said Letters Patent is hereby corrected as shown below:

On the Title page, at item [63], replace   "Continuation of Ser. No 143,689, Oct. 28, 1993, abandoned."
with      --Continuation–in-part of Ser. No. 143,689, Oct. 28, 1993, Abandoned--.

On the Title page, at item [75], replace   "Gregory Funk, Delta; Ronald J. Vanderhelm, Surrey, both of Canada"
with      --Gregory Funk, Delta; Ronald J. Vanderhelm; Denis Beaudoin, both of Surrey, all of Canada; David W. Russo, Woodinville, Washington--.

Signed and Sealed this

Twenty-sixth Day of December, 2000

Attest:

Q. TODD DICKINSON

*Attesting Officer*    *Director of Patents and Trademarks*